J. R. MILLER.
PRESSURE REGULATOR.
APPLICATION FILED AUG. 25, 1914.
1,202,403.
Patented Oct. 24, 1916.
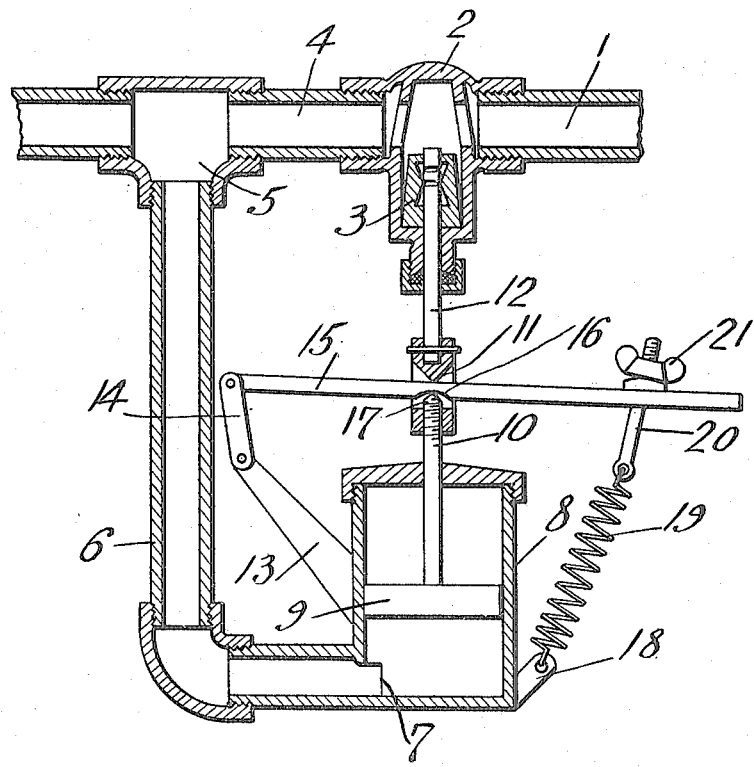
Witnesses
J. R. Miller
Inventor
by
Attorneys

UNITED STATES PATENT OFFICE.

JOHN R. MILLER, OF SAN DIMAS, CALIFORNIA.

PRESSURE-REGULATOR.

1,202,403.  Specification of Letters Patent.  Patented Oct. 24, 1916.

Application filed August 25, 1914. Serial No. 858,538.

*To all whom it may concern:*

Be it known that I, JOHN R. MILLER, a citizen of the United States, residing at San Dimas, in the county of Los Angeles and State of California, have invented a new and useful Pressure-Regulator, of which the following is a specification.

The present invention relates to improvements in pressure regulators, one object of the invention, being the provision of a simple and inexpensive as well as durable regulator of this character, which is adapted to be connected between the water main and supply pipe, so that any undue pressure within the supply pipe within the house from the main may be regulated as the faucet or the valve is turned off, so as to prevent any rupture or bursting of the pipes.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein the figure is a sectional view of the regulator, portions being illustrated in elevation.

The numeral 1 designates the supply pipe which is led from the main (not shown) through the valve casing 2, and by the pipe 4 to the proper outlet. The coupling 5 is connected to the pipe 4 and has led therefrom, the branch pipe 6 which supplies the pressure fluid through the port 7 into the valve controlling chamber 8. The chamber 8 has mounted therein, the plunger or piston 9, whose stem 10 is slidably mounted through the detachable cover 8' of the cylinder 8, and is connected to the coupling 11, which also is connected to the lower end of the valve stem 12, which is connected to operate the cone valve 3. Thus as the pressure increases below the piston 9, the piston is elevated and through the yoke or coupling 11 it elevates and closes the valve 3.

In order to provide a means for regulating the action of the piston 9 and consequently the action of the valve 3, due to the increased or decreased pressure within the pipe 6, supplied through the pipe 4, the bracket 13 is carried by the cylinder 8 and is connected by the link 14 to one end of the regulating lever 15, said lever 15 being provided with the recessed portion 16 within the coupling link 11 for engagement with the cone end 17 of the piston rod 10, thus reducing the friction to a minimum at this point. In order to adjust the lever, the cylinder 8 has at one end connected to it the coiled spring 19 while the opposite end of said spring is adjustably connected by the adjusting screw 20 which is connected to the free end of the lever 15 and is adjusted by means of the thumb screw 21. By this means, the action of the lever and consequently the effect thereof upon the piston 9 may be adjusted to an exactness, so that the valve 3 is only operated when a predetermined pressure is admitted to the lower end of the cylinder 8.

Any form of valve found most suitable, may be used.

What is claimed is:

In a device of the character described, a valve having a plunger, a cylinder, a piston working in the cylinder and having a piston rod projecting toward and in alinement with said plunger, a yoke connecting the adjacent ends of said plunger and piston rod, the piston rod being threaded within one end of the yoke and having a cone point projecting within the yoke, the yoke having an opposite V-shaped bearing, and a lever projecting through the yoke and resting against said bearing, said lever having a recess opposite said bearing receiving said cone point.

In testimony that I claim the foregoing as my own, I have hereto affixed my signature in the presence of two witnesses.

JOHN R. MILLER.

Witnesses:
 H. H. JONES,
 G. CYRIL PLATT.

Copies of this patent may be obtained for five cents each, by addressing the "Commissioner of Patents, Washington, D. C."